United States Patent
Xu et al.

(10) Patent No.: US 8,743,744 B2
(45) Date of Patent: Jun. 3, 2014

(54) METHOD AND APPARATUS FOR MULTIPLEXING AN ANTENNA ELEMENT, AND ANTENNA COMPONENT

(75) Inventors: Xiangning Xu, Shanghai (CN); Jianfeng Wu, Shanghai (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 13/530,716

(22) Filed: Jun. 22, 2012

(65) Prior Publication Data

US 2012/0263077 A1 Oct. 18, 2012

Related U.S. Application Data

(63) Continuation of application No. PCT/CN2010/080183, filed on Dec. 23, 2010.

(30) Foreign Application Priority Data

Dec. 23, 2009 (CN) .......................... 2009 1 0189237

(51) Int. Cl.
| | | |
|---|---|---|
| H04B 7/00 | (2006.01) | |
| H04B 1/40 | (2006.01) | |
| H04B 1/00 | (2006.01) | |
| H04B 1/52 | (2006.01) | |

(52) U.S. Cl.
CPC ................ H04B 1/0057 (2013.01); H04B 1/52 (2013.01); *H04B 1/005* (2013.01)
USPC ................ 370/277; 455/82; 455/83

(58) Field of Classification Search
None
See application file for complete search history.

(56) References Cited

U.S. PATENT DOCUMENTS

| | | |
|---|---|---|
| 2004/0116089 A1 | 6/2004 | Lee et al. |
| 2005/0239416 A1 | 10/2005 | Shimizu |
| 2006/0014568 A1 | 1/2006 | Licht |
| 2006/0061511 A1 | 3/2006 | Enoki et al. |

(Continued)

FOREIGN PATENT DOCUMENTS

| | | |
|---|---|---|
| CN | 101068399 A | 11/2007 |
| CN | 101207874 A | 6/2008 |

(Continued)

OTHER PUBLICATIONS

Office Action issued in corresponding Chinese Patent Application No. 200910189237.8, mailed Jun. 1, 2012.

(Continued)

*Primary Examiner* — Marcus R Smith
(74) *Attorney, Agent, or Firm* — Brinks Gilson & Lione

(57) ABSTRACT

A method and an apparatus for multiplexing an antenna element, and an antenna component can reduce power loss caused by multiplexing of the antenna element. The apparatus includes an antenna element, a filter, and a DUP. The antenna element is connected to the filter and the DUP separately, and a suppression band of the filter includes a bandpass band of the DUP. The filter is configured to filter the signals sent by the antenna element and the DUP and/or the signals to be sent to the antenna element and the DUP to make signals of a first band pass through. The DUP is configured to filter the signals sent by the antenna element and the filter and/or the signals to be sent to the antenna element and the filter to make signals of a second band pass through.

10 Claims, 5 Drawing Sheets

(56) References Cited

U.S. PATENT DOCUMENTS

| | | | |
|---|---|---|---|
| 2006/0199549 A1* | 9/2006 | Lee et al. | 455/82 |
| 2007/0191055 A1 | 8/2007 | Kovacs et al. | |
| 2008/0081577 A1* | 4/2008 | Rofougaran | 455/187.1 |
| 2008/0096492 A1 | 4/2008 | Yoon | |
| 2009/0017772 A1* | 1/2009 | Kemmochi et al. | 455/73 |
| 2009/0156152 A1* | 6/2009 | Sahota et al. | 455/296 |
| 2009/0275357 A1* | 11/2009 | Nakamura et al. | 455/550.1 |
| 2009/0285135 A1 | 11/2009 | Rousu et al. | |
| 2010/0093282 A1* | 4/2010 | Martikkala et al. | 455/63.4 |
| 2010/0210208 A1* | 8/2010 | Gorbachov | 455/41.2 |

FOREIGN PATENT DOCUMENTS

| | | |
|---|---|---|
| CN | 101777932 A | 7/2010 |
| EP | 1111821 A2 | 6/2001 |
| EP | 1705747 A1 | 9/2006 |
| EP | 1876721 A1 | 1/2008 |
| JP | 2000115016 A | 4/2000 |
| JP | 2005079885 A | 3/2005 |
| JP | 2005-101938 A | 4/2005 |
| JP | 2005-295312 A | 10/2005 |
| JP | 2006-86871 | 3/2006 |
| JP | 2007-511145 A | 4/2007 |
| WO | WO 01/28114 A1 | 4/2001 |
| WO | WO 02/075942 A2 | 9/2002 |
| WO | WO 2004/051790 A2 | 6/2004 |

OTHER PUBLICATIONS

International Search Report and Written Opinion of the International Searching Authority issued in corresponding PCT Patent Application No. PCT/CN2010/080183, mailed Mar. 24, 2011.
Lei, "The Feasibility of GSM900/WCDMA Shared Antenna and Feeder" China Academic Journal Electronic Publishing House, 2006.
Office Action issued in corresponding Chinese Patent Application No. 200910189237.8, mailed Jan. 17, 2013.
Extended European Search Report issued in corresponding European Patent Application No. 10838696.2, mailed Apr. 12, 2013.
Office Action issued in corresponding Chinese Patent Application No. 200910189237.8, mailed Jun. 6, 2013, 11 pages.

* cited by examiner

US 8,743,744 B2

METHOD AND APPARATUS FOR MULTIPLEXING AN ANTENNA ELEMENT, AND ANTENNA COMPONENT

CROSS-REFERENCE TO RELATED APPLICATIONS

This application is a continuation of International Application No PCT/CN2010/080183, filed on Dec. 23, 2010, which claims priority to Chinese Patent Application No. 200910189237.8, filed on Dec. 23, 2009, all of which are hereby incorporated by reference in their entireties.

FIELD OF THE INVENTION

The present invention relates to communication technologies, and in particular, to a method and an apparatus for multiplexing an antenna element, and an antenna component.

BACKGROUND OF THE INVENTION

With the development of wireless communications, an Active Antenna System (AAS, Active Antenna System) is applied to communication systems increasingly. The AAS is mainly characterized in that an antenna element is directly connected to a transceiver so that each element is used by only one transceiver. A Radio Frequency (RF) front end of n paths of AASs includes Ant element (an antenna element, also called an antenna oscillator) which is connected to a duplexer (DUP, DUPlexer). The DUP is connected to a receiving channel and a power amplifier separately. Generally, an antenna includes multiple paths of antenna elements so as to achieve a transmitting or receiving gain of a signal.

In the process of researching the present invention, the inventors find that great power loss is caused when an AAS and a passive antenna multiplex an antenna element by adopting a conventional combining technology (namely, in a direct combining manner).

SUMMARY OF THE INVENTION

In view of this, embodiments of the present invention provide a method and an apparatus for multiplexing an antenna element, and an antenna component to reduce power loss caused by multiplexing of the antenna element.

In an aspect, the present invention provides an apparatus for multiplexing an antenna element, which includes an antenna element, a filter, and a DUP.

The antenna element is connected to the filter and the DUP separately, and the suppression band of the filter includes the bandpass band of the DUP.

The antenna element is configured to receive signals to be sent to the filter or DUP, and/or transmit signals sent from the filter or DUP.

The filter is configured to filter the signals sent by the antenna element and the DUP and/or the signals to be sent to the antenna element and the DUP to make the signals of the first band pass through.

The DUP is configured to filter the signals sent by the antenna element and the filter and/or the signals to be sent to the antenna element and the filter to make the signals of the second band pass through.

The first band is located on the non-suppression band of the filter, and the second band is located on the bandpass band of the DUP.

In another aspect, the present invention further provides an antenna component, which includes at least one path of any apparatus for multiplexing an antenna element according to an embodiment of the present invention.

In still another aspect, the present invention further provides a base station, which includes any antenna component according to an embodiment of the present invention.

In yet another aspect, the present invention further provides a method for multiplexing an antenna element, which includes:

through an antenna element, receiving signals to be sent to a filter or DUP and/or transmitting signals sent from the filter or DUP;

through the filter, filtering the signals sent by the antenna element and the DUP and/or the signals to be sent to the antenna element and the DUP to make signals of a first band pass through; and through the DUP, filtering the signals sent by the antenna element and the filter and/or the signals to be sent to the antenna element and the filter to make signals of a second band pass through, where a suppression band of the filter includes a bandpass band of the DUP; the first band is located on a non-suppression band of the filter, and the second band is located on the bandpass band of the DUP.

By adopting the method and the apparatus for multiplexing an antenna element, the antenna component, and the base station according to the embodiments of the present invention, power loss caused by multiplexing of the antenna element can be reduced.

DETAILED DESCRIPTION OF THE EMBODIMENTS

The embodiments of the present invention provide a method and an apparatus for multiplexing an antenna element, and an antenna component, which are applicable to various wireless networks including various mobile networks such as Global System for Mobile communications (GSM), Wideband Code Division Multiple Access (WCDMA), Time Division-Synchronous Code Division Multiple Access (TD-SCDMA), and Long Term Evolution (LTE), and also applicable to other scenarios that require multiplexing of the antenna element, such as, a radar system, and a fixed wireless access system.

Figure 1:
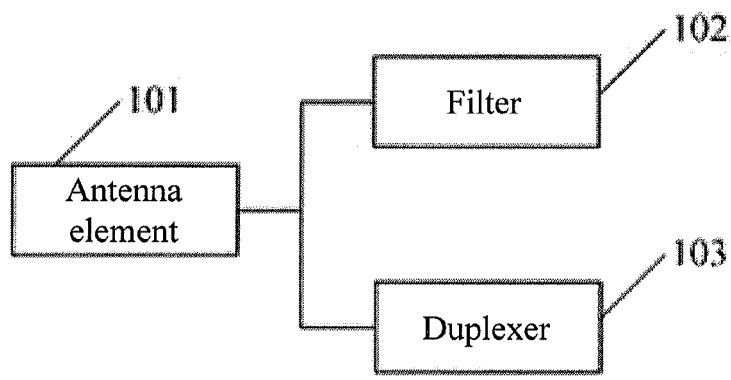
FIG. 1 is a schematic structure diagram of an apparatus for multiplexing an antenna element according to an embodiment of the present invention.

As shown in FIG. 1, an embodiment of the present invention provides an apparatus for multiplexing an antenna element, which includes an antenna element 101, a filter 102, and a DUP 103.

The antenna element 101 is connected to the filter 102 and the DUP 103 separately, and the suppression band of the filter 102 is the bandpass band of the DUP 103.

The antenna element 101 is configured to receive signals to be sent to the filter 102 or DUP 103 and/or transmit signals sent from the filter 102 or DUP 103;

The filter 102 is configured to filter the signals sent by the antenna element 101 and the DUP 103 and/or the signals to be sent to the antenna element 101 and the DUP 103 to make signals of a first band pass through; and The DUP 103 is configured to filter the signals sent by the antenna element 101 and the filter 102 and/or the signals to be sent to the antenna element 101 and the filter 102 to make signals of a second band pass through; and The first band is located on a non-suppression band of the filter 102, and the second band is located on a bandpass band of the DUP 103. It is understandable that the first band does not intersect the second band.

By adopting the apparatus for multiplexing an antenna element according to the embodiment of the present invention, the antenna element may be multiplexed, power loss caused by multiplexing of the antenna element may be reduced, and the antenna element is made full use of, thereby reducing the cost of the antenna component.

In another embodiment of the present invention, the filter 102 in the apparatus for multiplexing an antenna element may be a bandstop filter, and the suppression band of the bandstop filter includes the bandpass band of the DUP.

The bandpass band of the DUP in the embodiments of the present invention refers to the band that the DUP can pass through. The DUP may be implemented by a bandpass filter, or a lowpass filter, or a highpass filter, or a bandstop filter, or any combination thereof, or the implementation manner of the DUP may be other manners in the embodiments of the present invention, which are not limited herein.

By adopting the apparatus for multiplexing an antenna element according to the embodiment of the present invention, the passive antenna and the active antenna are enabled to multiplex the antenna element, and power loss caused by multiplexing of the antenna element may be reduced, thereby reducing the cost of the antenna component.

Figure 2:
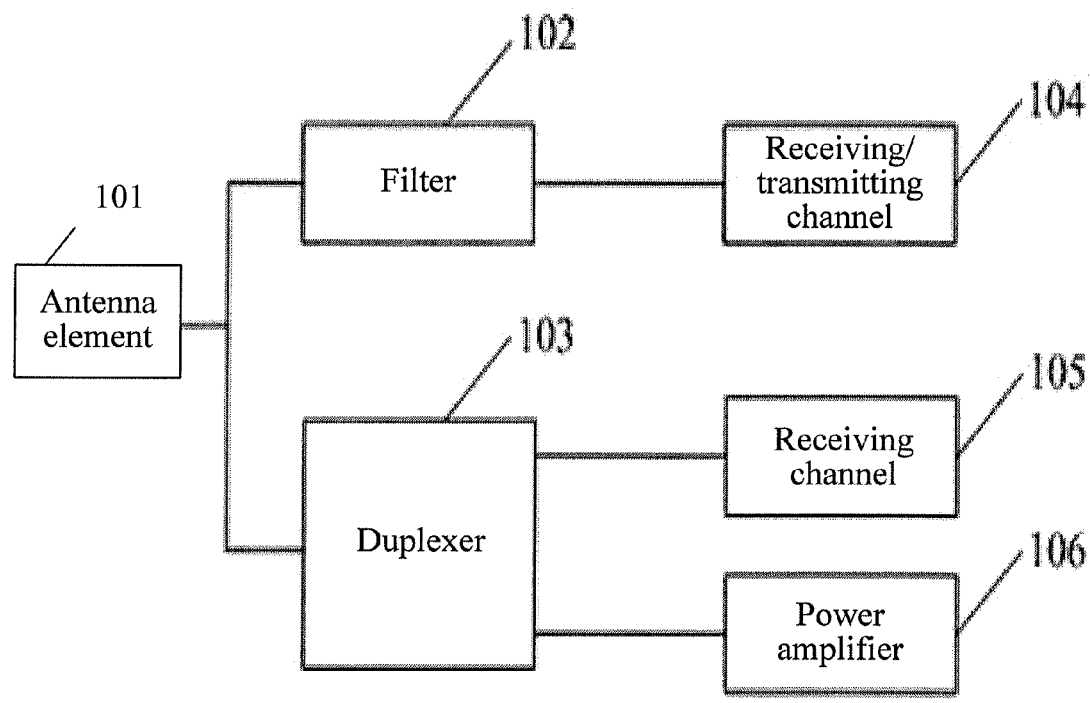
FIG. 2 is a schematic structure diagram of an apparatus for multiplexing an antenna element according to another embodiment of the present invention.

As shown in FIG. 2, in another embodiment of the present invention, the apparatus for multiplexing an antenna element further includes a receiving channel 105 and a PA 106. The receiving channel 105 is connected to the DUP 103, and is configured to receive signals sent by the DUP 103; and the PA 106 is connected to the DUP 103, and is configured to perform power amplification on the signals to be sent to the DUP 103.

It should be understood that the receiving channel 105 is located on the receiving part, and the PA 106 is located on the transmitting part. An AAS may further include a feedback part, which processes the signals separated from the signals sent from the PA to the DUP and obtains corrected signals, so as to perform signal offset processing on the receiving part or perform digital pre-distortion processing on the transmitting part.

As shown in FIG. 2, in another embodiment of the present invention, the apparatus for multiplexing an antenna element further includes a receiving/transmitting channel 104. The receiving/transmitting channel 104 is connected to the filter 102, and is configured to receive signals sent by the filter 102, and/or receive signals to be sent to the filter 102 and send the signals to the filter 102.

The apparatus for multiplexing an antenna element according to the embodiment of the present invention is applicable to a scenario in which the antenna element is multiplexed by an ASS and a passive antenna. Generally, an ASS includes an antenna element (Ant element), a receiving part, and a transmitting part, or may further include a feedback part.

The receiving part may include a receiving RF part, an Intermediate Frequency (IF) part and a digital part.

Figure 3:
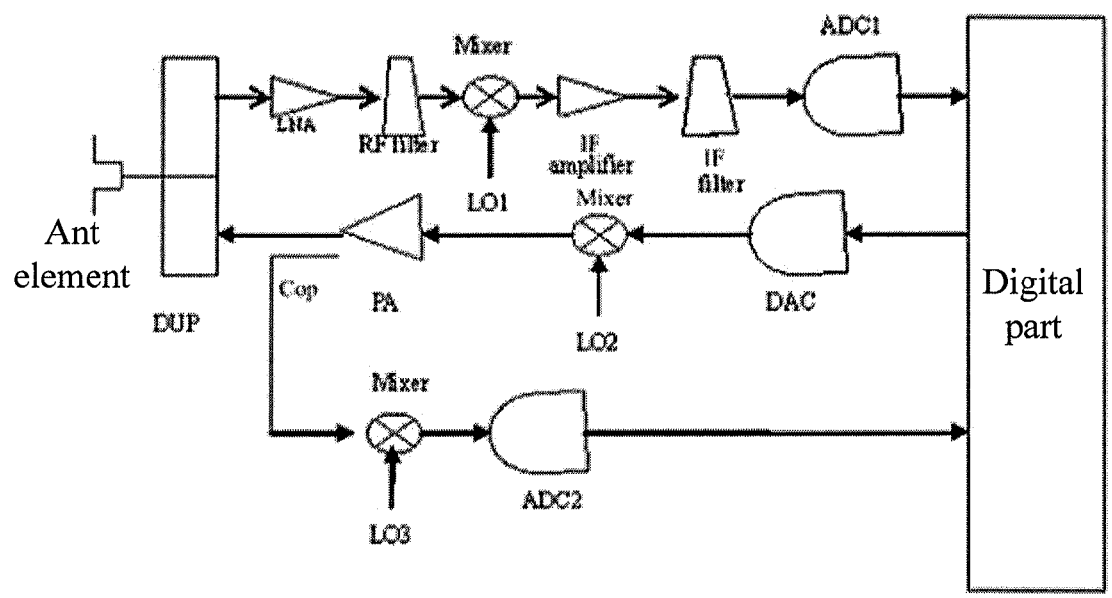
FIG. 3 is a schematic structure diagram of a general AAS according to an embodiment of the present invention.

As shown in FIG. 3, the receiving RF part may include: a Low Noise Amplifier (LNA), a RF filter (RF filter), and a mixer (Mixer); and the IF part may include an IF amplifier (IF amplifier), an IF filter (IF filter), and an Analog-Digital Converter (ADC). The ADC is connected to the digital part.

The LNA is configured to amplify the signals received by the antenna element, but the noise of the LNA itself is very low. The RF filter is configured to allow a specific RF signal to pass through, and suppress an outband interference signal to be sufficiently small; the mixer is configured to modulate the RF signal onto a proper IF; and the IF amplifier is configured to amplify the signal output by the mixer, and the amplified signal is filtered by the IF filter, sent to the ADC for analog-digital conversion, and then sent to the digital part for processing.

As shown in FIG. 3, the transmitting part may include: a Power Amplifier (PA), an RF mixer (Mixer), and a Digital-Analog Converter (DAC). The DAC converts the baseband signal sent by the digital part into an analog signal, and the mixer converts the analog signal into an RF signal and then sends the RF signal to the PA. The PA amplifies the signal and sends the amplified signal to the DUP, and the DUP sends the signal to the antenna element.

The feedback part may include a power coupler (Cop), a mixer (Mixer), and an ADC.

In FIG. 3, LO indicates a local oscillation signal.

Figure 4:
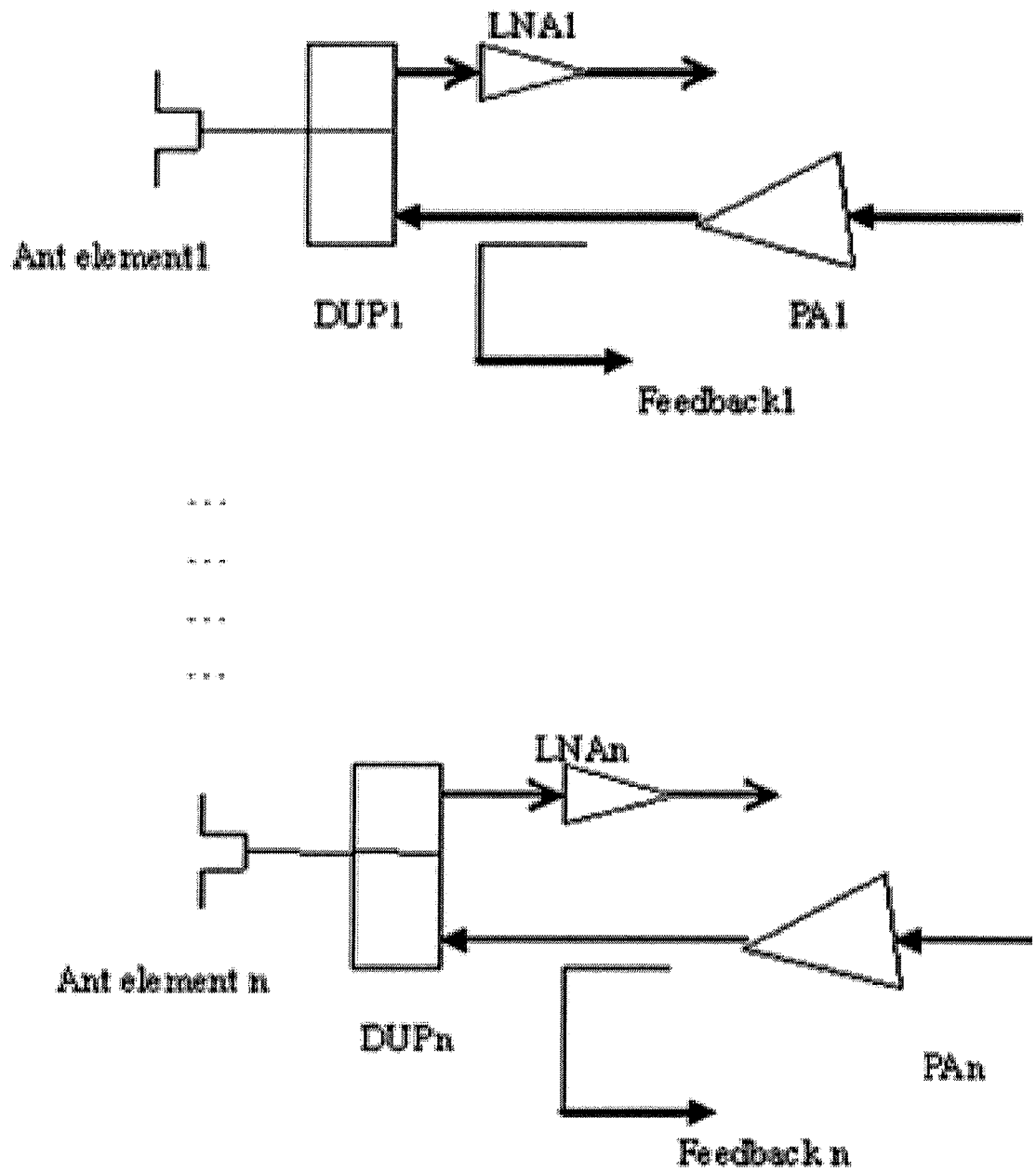
FIG. 4 is a schematic structure diagram of an RF front end inclusive of n paths of AASs according to an embodiment of the present invention.

FIG. 4 is a schematic structure diagram of an RF front end inclusive of n paths of ASSs (n is a positive integer greater than 1).

Further, an embodiment of the present invention provides an antenna component. The antenna component includes at least one path of any apparatus for multiplexing an antenna element according to the embodiment of the present invention.

Figure 5:
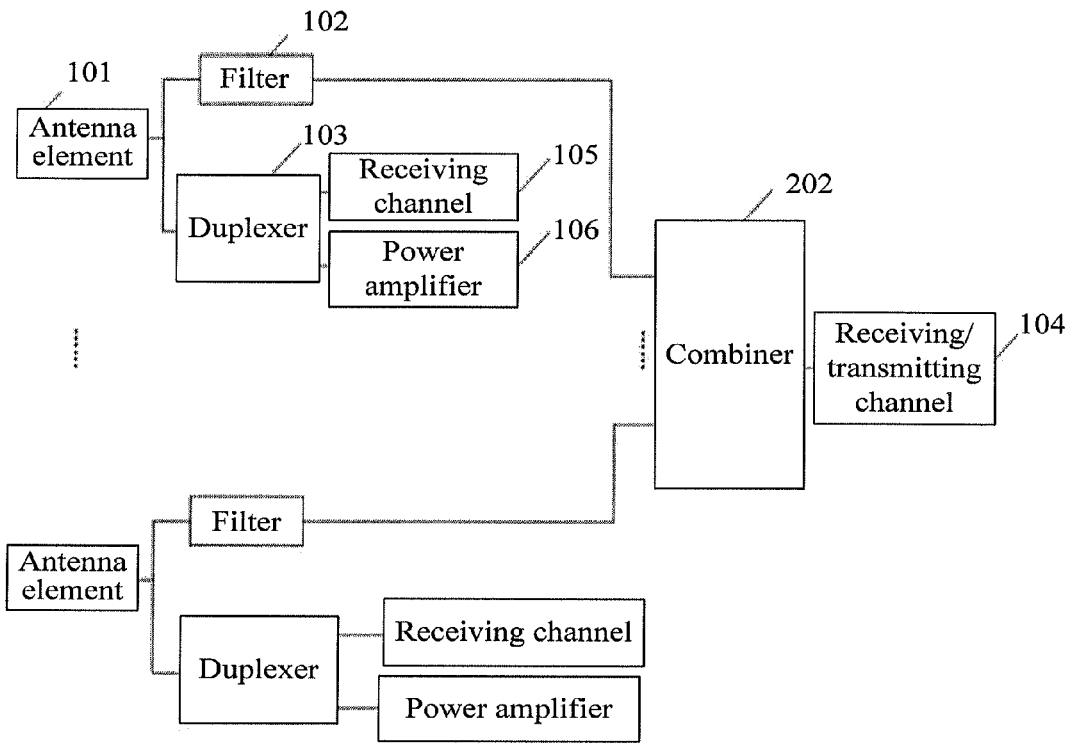
FIG. 5 is a schematic structure diagram of an antenna component according to an embodiment of the present invention.

If the antenna component includes more than one path of any apparatus for multiplexing an antenna element according to the embodiment of the present invention (in this embodiment, taking the apparatus for multiplexing an antenna element shown in FIG. 2 as an example), the antenna component further includes a combiner 202, as shown in FIG. 5. One end of the combiner 202 is connected to a filter 102 in each path of apparatus for multiplexing an antenna element, and the other end of the combiner 202 is connected to the receiving/transmitting channel 104. The combiner 202 is configured to: receive signals sent by the filter 102 in each path of apparatus for multiplexing an antenna element, combine the received signals, and send the signals to the receiving/transmitting channel 104; and/or receive signals to be sent to the filter 102 in each path of apparatus for multiplexing an antenna element, split the received signals, and send the signals to the filter 102 in each path of apparatus for multiplexing an antenna element.

The receiving/transmitting channel 104 may be a Remote Radio Unit (RRU).

The antenna component according to the embodiment of the present invention is applicable to a multi-band base station.

Further, an embodiment of the present invention provides a method for multiplexing an antenna element. The method includes:

through an antenna element, receiving signals to be sent to a filter or DUP and/or transmitting signals sent from the filter or DUP;

through the filter, filtering the signals sent by the antenna element and the DUP and/or the signals to be sent to the antenna element and the DUP to make signals of a first band pass through; and through the DUP, filtering the signals sent by the antenna element and the filter and/or the signals to be sent to the antenna element and the filter to make signals of a second band pass through, where a suppression band of the filter includes a bandpass band of the DUP; the first band is located on a non-suppression band of the filter, and the second band is located on the bandpass band of the DUP. It is understandable that the first band does not intersect the second band.

In the method for multiplexing an antenna element according to this embodiment of the present invention, the filter may be a bandstop filter, and the suppression band of the bandstop filter includes the bandpass band of the DUP.

Further, an embodiment of the present invention provides a method for multiplexing an antenna element. The method includes:

through an antenna element, receiving signals to be sent to a filter or DUP and/or transmitting signals sent from the filter or DUP;

through the filter, filtering the signals sent by the antenna element and the DUP and/or the signals to be sent to the antenna element and the DUP to make signals of a first band pass through; and through the DUP, filtering the signals sent by the antenna element and the filter and/or the signals to be sent to the antenna element and the filter to make signals of a second band pass through, where a suppression band of the filter includes a bandpass band of the DUP; the first band is located on a non-suppression band of the filter, and the second band is located on the bandpass band of the DUP;

the number of antenna elements, the number of filters and the number of DUPs are equal, and are all greater than one path; and through the combiner, signals of the first band that pass through each path of filter are received, combined and then sent; and/or through the combiner, signals of the first band to be sent to each path of filter are received, splits, and then sent to each path of filter.

Further, an embodiment of the present invention provides a base station. The base station includes any antenna component according to the embodiment of the present invention.

The method and the apparatus for multiplexing an antenna element, and the antenna component according to the embodiments of the present invention can multiplex an antenna element, reduce power loss caused by multiplexing of the antenna element, and make full use of the antenna element, so that the cost of the antenna component is reduced.

Figure 6:
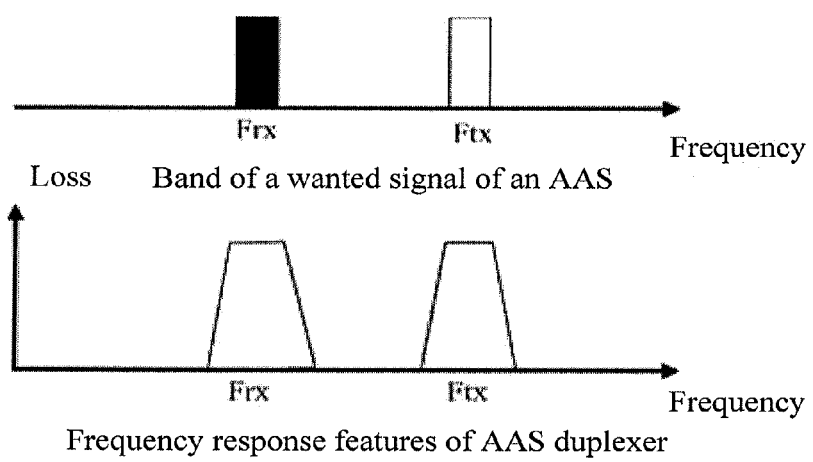
FIG. 6 is a schematic diagram of a band of a wanted signal of an AAS and frequency response features of a DUP of the AAS in a specific example of the present invention.

The following gives more details through a specific example:

As shown in FIG. 6, it is assumed that the central frequency of the band (Ftx) of the AAS for transmitting a wanted signal is f1, and the bandwidth is BW; and that the central frequency of the band (Frx) of the AAS for receiving a wanted signal is f2, and the bandwidth is BW. The two bands correspond to the central frequency and the bandwidth of the transmitting filter and the receiving filter of the DUP of the AAS respectively.

Figure 7:
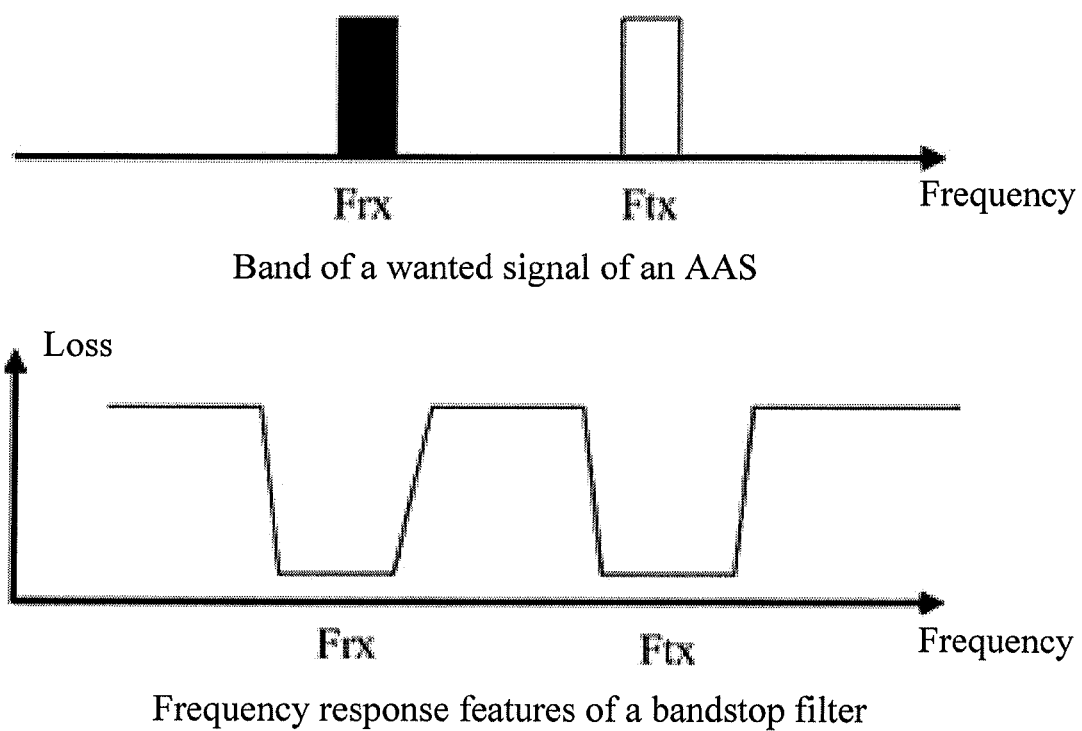
FIG. 7 is a schematic diagram of a band of a wanted signal of an AAS and frequency response features of a bandstop filter in a specific example of the present invention.

In this example, the filter is a bandstop filter. The frequency response features of the bandstop filter are contrary to the frequency response features of the DUP of the AAS. That is, the bandstop filter suppresses wanted bands of the uplink and the downlink of the AAS strongly, but does not suppress the band which needs to be transmitted and/or received through an antenna element, as shown in FIG. 7.

In this example, because the frequency response features of the DUP are contrary to those of the bandstop filter, for the wanted signals of the AAS, the wanted signals of the AAS suffer no power loss in a conventional sense (namely, power loss caused by direct splitting, generally 3 dB) after the antenna element splits the signals and distributes the signals to the bandstop filter. As regards the wanted signals of the passive antenna which pass through the bandstop filter, the band of the wanted signals does not intersect the band of the wanted signals of the AAS. Because the DUP of the AAS suppresses the band of the wanted signals of the passive antenna, the wanted signals of the passive antenna suffer no power loss in a conventional sense (namely, power loss caused by direct splitting, generally 3 dB) after the antenna element splits the signals and distributes the signals to the DUP.

It should be understood that in the embodiments of the present invention, as long as the filter can suppress the band of the AAS by more than 20 dB, requirements of the filter may be not high. The filter may be implemented by using an integrated component or using a microstrip circuit on the antenna element. The filter may be a bandstop filter, or a bandpass or lowpass filter of other bands, as long as the filter suppresses the signals of the wanted band of the AAS sufficiently.

By adopting the method and the apparatus for multiplexing an antenna element, and the antenna component according to the embodiments of the present invention, an antenna element can be multiplexed, and the antenna element is made full use of, thereby reducing the cost of the antenna component.

Persons of ordinary skill in the art should understand that all or part of the steps of the method according to any embodiment of the present invention may be implemented by a program instructing relevant hardware. The program may be stored in computer-readable storage medium. When the program runs, the program executes the steps of the method according to any embodiment of the present invention. The storage medium may be any medium capable of storing program codes, such as a Read-Only Memory (ROM), Random Access Memory (RAM), magnetic disk, or optical disk.

Persons of ordinary skill in the art should understand that the names of the apparatuses or modules given herein may vary with the technical evolution or application scenario, and such variation does not affect implementation of the present invention and shall fall within the scope of the present invention. The apparatuses or modules described herein are termed functionally, and may be combined or split physically.

Given above are several embodiments of the present invention. Persons skilled in the art can make modifications and variations to the present invention without departing from the scope or spirit of the present invention. The present invention shall cover the modifications and variations provided that they fall within the scope of protection defined by the appended claims or their equivalents.

What is claimed is:

1. An antenna component, comprising at least two paths for multiplexing an antenna element, wherein each path comprises an antenna element, a filter and a duplexer, wherein:

the antenna element is interconnected to the filter and the duplexer, wherein a suppression band of the filter comprises a pass band in the duplexer;

the antenna element is configured for receiving first signals and transmitting second signals and third signals, wherein:

the first signals comprises first frequency band signals and second frequency band signals and the first signals are to be received by both the filter and the duplexer, the second signals are passed by the filter for transmission via the antenna element, and the third signals are passed by the duplexer for transmission by the antenna element;

the filter is configured for filtering the received first signals to allow passing of the first frequency band signals and for blocking the third signals from the duplexer;

the duplexer is configured for filtering the received first signals to allow passing of the second frequency band signals and for blocking the second signals from the filter;

wherein the first frequency band signals are located within a pass band of the filter, and the second frequency band signals are located within a pass band of the duplexer; and a plurality of the antenna elements in the antenna component form one antenna; and wherein the antenna component further comprises a combiner disposed between the filter and a channel, which is one of a transmitter (TX), a receiver (RX) and a transceiver (TRX), wherein:

one end of the combiner is connected to the at least two antenna elements through corresponding filters in the at least two paths for multiplexing;

the combiner is configured for performing at least one of: combining received corresponding first frequency band signals in the at least two paths for multiplexing, and splitting the received second signals from the channel into corresponding second signals to be passed by corresponding filters for transmission via corresponding at least two antenna elements.

2. The antenna component according to claim 1, further comprising:

a receiving channel and a power amplifier, wherein: the receiving channel is connected to the antenna element through the duplexer and is configured to receive the second frequency band signals, and the power amplifier is connected to the antenna element through the duplexer and is configured to perform power amplification on the third signals for transmission via the antenna element.

3. The antenna component according to claim 2, wherein the receiving channel and the power amplifier are parts of an active antenna system.

4. The antenna component according to claim 1, wherein: the filter is implemented by using an integrated component or using a microstrip circuit on the antenna element.

5. The antenna component according to claim 1, wherein: the channel is connected to the corresponding at least one antenna elements through the combiner and the corresponding filters, and is configured for performing at least one of receiving the combined signals from the combiner; and transmitting the second signals which are to be split by the combiner and to pass through the corresponding filters for transmission via the corresponding at least one antenna elements.

6. A base station, comprising an antenna component including at least two paths for multiplexing an antenna element, wherein each path comprises an antenna element, a filter and a duplexer, wherein:

the antenna element is interconnected to the filter and the duplexer, wherein a suppression band of the filter comprises a pass band in the duplexer;

the antenna element is configured for receiving first signals and transmitting second signals and third signals, wherein:

the first signals comprises first frequency band signals and second frequency band signals and the first signals are received by both the filter and the duplexer, the second signals are passed by the filter for transmission via the antenna element, and the third signals are passed by the duplexer for transmission by the antenna element;

the filter is configured for filtering the received first signals to allow passing of the second frequency band signals and for blocking the third signals from the duplexer;

the duplexer is configured for filtering the received first signals to allow passing of the second frequency band signals and for blocking the second signals from the filter;

wherein the first frequency band signals are located within a pass band of the filter, and the second frequency band signals are located within a pass band of the duplexer; and a plurality of the antenna elements in the antenna component form one antenna; and wherein the antenna component further comprises a combiner disposed between the filter and a channel, which is one of a transmitter (TX), a receiver (RX) and a transceiver (TRX), wherein:

one end of the combiner is connected to the at least two antenna elements through corresponding filters in the at least two paths for multiplexing;

the combiner is configured for performing at least one of: combining received corresponding first frequency band signals in the at least two paths for multiplexing, and splitting the received second signals from the channel into corresponding second signals to be passed by corresponding filters for transmission via corresponding at least two antenna elements.

7. The base station according to claim 6, further comprising the channel which is a part of remote radio unit, wherein:

the channel is connected to the corresponding antenna elements through the combiner, and each of the corresponding filters is configured to perform at least one of receive the corresponding split second signals from the combiner for transmission via the corresponding antenna element; and receive the corresponding first frequency band signals to be combined by the combiner.

8. A method for multiplexing an antenna element, comprising:

through an antenna element, receiving first signals for a filter and a duplexer, and transmitting second signals from the filter and third signals from the duplexer, wherein:

the first signals comprises first frequency band signals and second frequency band signals and the first signals are received by both the filter and the duplexer, the second signals are passed by the filter for transmission via the antenna element, and the third signals are passed by the duplexer for transmission by the antenna element;

the filter is configured to filter the received first signals, to allow passing of the first frequency band signals and block the third signals from the duplexer;

the duplexer is configured to filter the received first signals to allow passing of the second frequency band signals and block the second signals from the filter;

wherein the first frequency band signals are located within a pass band of the filter, and the second frequency band signals are located within a pass band of the duplexer; and the antenna element is configured to be one of a plurality of antenna elements which form an antenna; and wherein the number of antenna elements, the number of filters and the number of duplexers are equal, and altogether forming more than one corresponding paths, wherein each corresponding path comprises at least a corresponding antenna element, a filter and a duplexer; and through a combiner disposed between the filter and a channel, which is one of a transmitter (TX), a receiver (RX) and a transceiver (TRX), combining all corresponding first frequency band signals received via the corresponding antenna elements after passing through the corresponding filters, through the combiner, splitting the second signals into corresponding second signals for transmission via the corresponding filters and the antenna elements on each of the corresponding path.

9. The method for multiplexing an antenna element according to claim 8, further comprising:

through a receiving channel, receiving the second frequency band signals, and through a power amplifier, performing power amplification on the third signals which are to be passed by the duplexer and for transmission by the antenna element, wherein the receiving channel and the power amplifier are parts of an active antenna system.

10. The method for multiplexing an antenna element according to claim 8, further comprising:

performing through a channel connected to the antenna element through the filter, at least one of: receiving the first frequency band signals; and transmitting the second signals via the antenna element through the filter, wherein the channel is a part of remote radio unit.

\* \* \* \* \*